June 25, 1968   R. A. COOK   3,389,768
CLUTCH WITH LEVER OPERATED DISC SPRING
Filed Nov. 14, 1966   2 Sheets-Sheet 1

Inventor
RONALD ALAN COOK
By John R. Faulkner
Clifford L. Sadler
Attorney

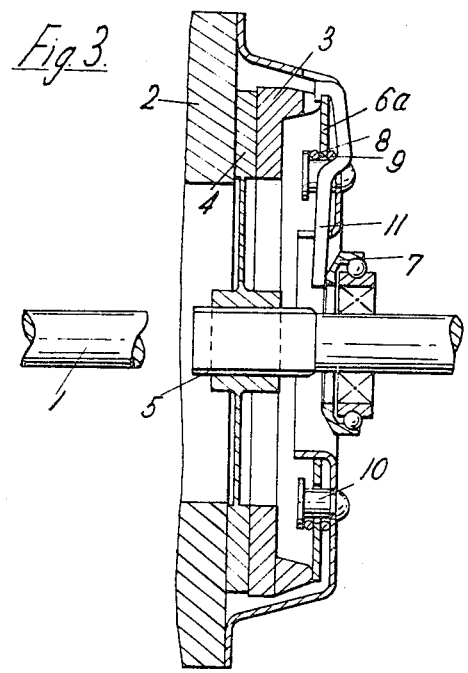
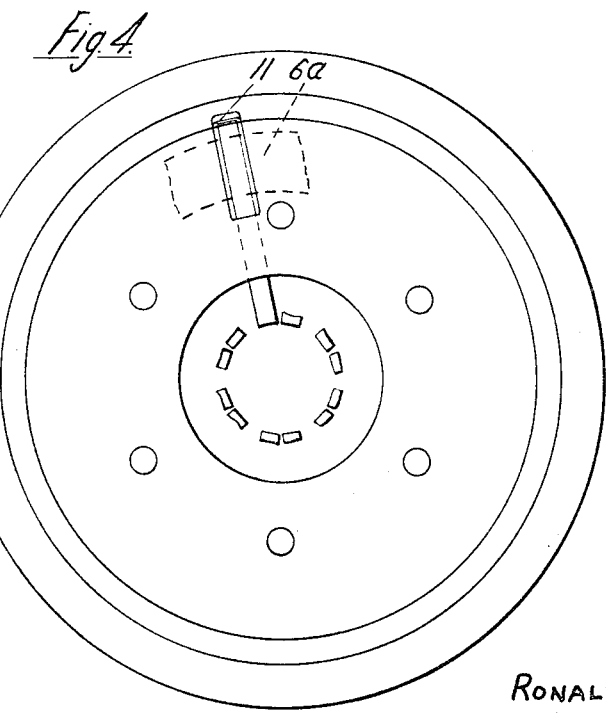

United States Patent Office 3,389,768
Patented June 25, 1968

3,389,768
CLUTCH WITH LEVER-OPERATED
DISC SPRING
Ronald Alan Cook, Hockley, England, assignor to Ford Motor Company, Dearborn, Mich., a corporation of Delaware
Filed Nov. 14, 1966, Ser. No. 594,023
8 Claims. (Cl. 192—70.27)

ABSTRACT OF THE DISCLOSURE

A clutch mechanism for a motor vehicle having, in its presently preferred embodiment, an annular flat clutch spring engaging relatively movable clutch input members. Clutch release levers engage the outer periphery of the spring and are constructed to bend it in a direction away from its engagement with one of the input members.

---

The present invention relates to clutch mechanisms for motor vehicles.

In a well-known construction of clutches, a diaphragm spring is employed to urge two clutch members together to clamp a clutch disc between them in order to transmit torque from an input to an output shaft. The diaphragm spring comprises an outer annular portion, the outer periphery of which engages one of the input members and a plurality of fingers extend radially inwardly from the annular portion. An annular fulcrum member abuts the spring where the outer ends of the fingers join the annular portion of the spring. The radially inner ends of the fingers are movable axially to cause the spring to flex about the annular fulcrum member to withdraw the outer periphery of the outer portion from the input member and thus release the pressure on the clutch.

In this known construction, the periphery of the annular portion must move a predetermined axial distance in order to release the clutch and this movement is produced by movement of the inner ends of the fingers a given amount in the opposite axial direction. However, owing to the relative flexibility of the fingers additional work must be done in flexing the fingers before corresponding movement of the periphery of the annular portion is effected. This extra work is reflected in the relatively high pedal pressure required to depress the clutch pedal, for a given pedal travel and given mechanical advantage of the linkage between the pedal and the clutch.

The present invention is concerned with reducing the clutch pedal pressure by modifying the known diaphragm spring.

According to one embodiment of the present invention, a clutch mechanism would have the following features:

(a) An input shaft is connected to drive two input clutch members;

(b) An output shaft has an annular clutch disc keyed to it and the periphery of the disc is located between the two input members;

(c) An annular sheet metal spring member is concentric with the output shaft and its outer periphery engages one input member to urge that input member toward the other input member to clamp the clutch disc between them and thus enable torque to be transmitted from the input to the output shaft through the clutch disc;

(d) A fulcrum member bears on the inner periphery of the annular spring member; and (e) A rigid lever member is movable to act upon the annular spring member to flex it about the fulcrum member to reduce the pressure on the outer periphery of the spring member on the one input member and thus release the clutch.

How the invention may be carried out will now be described with reference to the accompanying drawings, in which:

FIGURE 3 is a view similar to FIGURE 1 of a clutch incorporating the present invention; and FIGURE 4 is a view similar to FIGURE 2 of the clutch of FIGURE 3.

Figure 1:
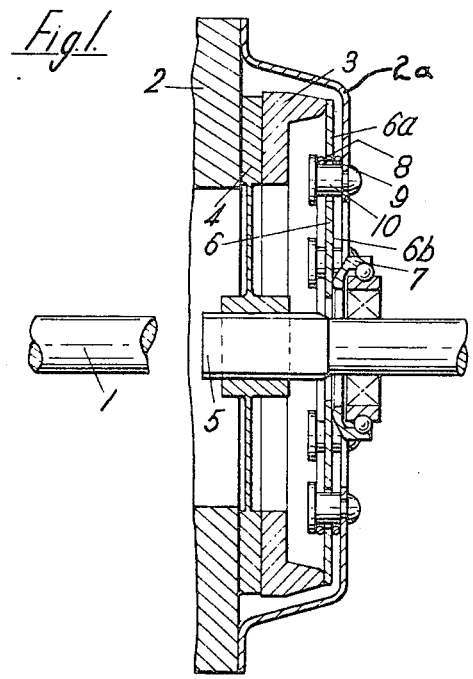
FIGURE 1 is a sectional view of a known construction of clutch mechanism.
Figure 2:
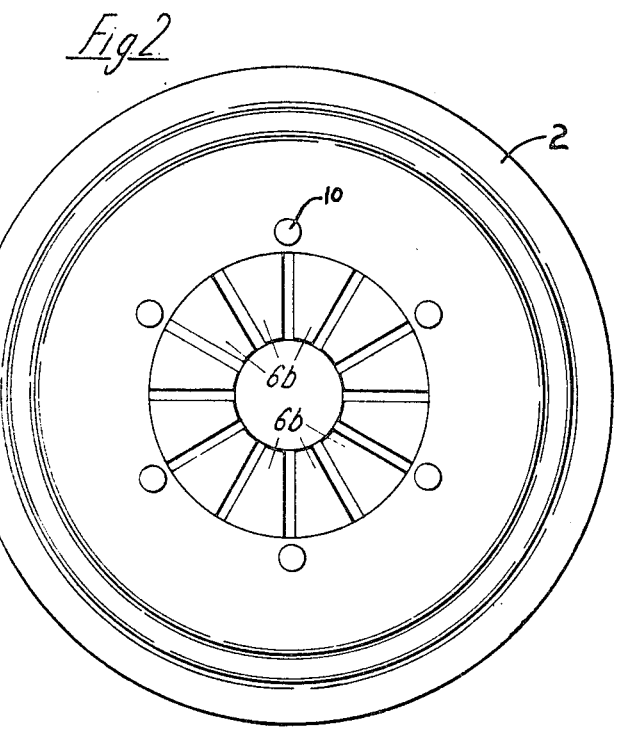
FIGURE 2 is an end view of FIGURE 1.

Referring to FIGURES 1 and 2, this known clutch mechanism has an input shaft 1 which comprises two input members 2 and 3 which are movable axially with respect to each other. A clutch disc 4 is splined to an output shaft 5 and has its outer periphery located between the input members 2 and 3. A diaphragm spring 6 which is coaxial with the output shaft 5 has its outer periphery abutting against the input member 3 to normally urge the input member 3 toward the input member 2 and thus clamp the clutch disc 4 between them so that torque can be transmitted to the output shaft 5 through the clutch disc 4.

The diaphragm spring 6 comprises an outer annular portion 6a and a plurality of radially inwardly extending fingers 6b. A pair of spaced apart rings 8 and 9 carried by studs 10 mounted on portion 2a of the input member 2, form a fulcrum member for the diaphragm spring. The rings 8 and 9 engage the diaphragm spring at the area where the radially outer ends of the fingers 6b join the annular portion 6a of the spring. The radially inner ends of the fingers 6b are movable to the left as seen in FIGURE 1 by a bearing 7 which is coaxial with the output shaft 5 and movable axially with respect to it. In order to disengage the clutch, the bearing 7 is moved to the left in FIGURE 1 by a suitable actuating mechanism (not shown) to cause the inner ends of the fingers 6b to move in the same direction. This results in the outer periphery of the annular portions 6a moving in the opposite axial direction away from member 3 and thus relieve the pressure on the input member 3.

In this known construction of clutch mechanism, the fingers 6b are relatively flexible so that initial movement of the bearing 7 is taken up in bending the fingers 6b and not in moving the outer periphery of the annular portion 6a. This means that in order to produce a given axial movement of the outer periphery of the annular portion 6a, extra work must be done in flexing the fingers 6b.

In the embodiment of the present invention as shown in FIGURES 3 and 4, the clutch mechanism is basically the same as that already described with reference to FIGURES 1 and 2 and the same reference numerals have been used to indicate corresponding parts. However, in this embodiment the diaphragm spring only consists of the annular portion 6a and the radial fingers 6b are replaced by rigid lever members 11. Each lever member 11 has a radially inner end which is engageable by the bearing 7 in the same way as the inner end of each finger 6b is engageable by the bearing 7 in the mechanism of FIGURES 1 and 2. The outer end of each lever member 11 is hook-shaped to engage the radially outer edge of the annular spring portion 6a. An intermediate part of each lever member 11 is shaped to co-operate with the ring 9 which acts as a fulcrum for the lever members 11. With this arrangement, axial movement of the bearing 7 to the left causes each lever member 11 to pivot about the ring 9 and to pull the outer periphery of the portion 6a away from the input member 3, thus releasing the clutch. Since the lever members 11 are rigid compared with the resilient fingers 6b, no extra work has to be done in order to flex the lever members 11. In other words, a smaller axial movement of the inner end of each lever 11 is required to disengage the clutch compared with the movement which would be necessary for the inner ends of the flexible fingers 6b in the known clutch mechanism of FIGURES 1 and 2. This means that it is possible to reduce the pedal pressure for a given pedal travel.

The following example will illustrate how this is achieved. Consider the clutch of FIGURES 1 and 2. Let the travel of the clutch pedal be 5 inches, the mechanical advantage of the linkage between the pedal and the bearing 7 be 10:1, the axial force that has to be applied by the bearing 7 in order to disengage the clutch be 200 pounds, and the axial distance the bearing 7 has to move be 0.5 inch. Then the work done by the bearing is equal to 100 inch pounds. Since this must equal the work done on the pedal the pedal pressure must be 20 pounds.

Consider the clutch of FIGURES 3 and 4. Let the pedal travel again be 5 inches and the bearing force be 200 pounds. However, since the relatively flexible fingers 6b are replaced by rigid members, the bearing travel will be less, say 0.1 inch. Now the work done by the bearing is 20 inch pounds. Since we wish to maintain the pedal travel at 5 inches and the work done on the pedal must equal 20 inch pounds, the new pedal pressure is 4 pounds. Of course, in order to keep the pedal travel the same, the mechanical advantage of the linkage must be altered to 50:1.

The pedal pressure of the known clutch of FIGURES 1 and 2 could of course be reduced by increasing the mechanical advantage of the linkage, but this by itself would result in the pedal travel being increased, in the example above to 25 inches. Therefore, the present invention enables the pedal pressure to be easily reduced while still maintaining the pedal travel within practical limits.

The foregoing description presents the presently preferred embodiment of this invention. Modifications and alterations may occur to those skilled in the art that will come within the scope and spirit of the following claims.

I claim:

1. A clutch mechanism having first and second relatively movable input members and an output member interposed between said input members, said members being arranged to rotate about a common axis, a flat annular spring having one portion engaging and exerting a force against said first input member and another portion engaging and exerting a force against said second input member whereby said input members are forced toward each other to clamp said output member therebetween, a plurality of rigid release levers connected to said spring and constructed to bend said spring in a direction away from its engagement with said first input member when said levers are angularly displaced thereby relieving the spring force on said first input member, said annular spring having an inner and an outer periphery, fulcrum means securing one of said peripheries to said second input member and said lever means connected to said spring adjacent the other of said peripheries.

2. A clutch mechanism according to claim 1 and in which a fulcrum means engages said spring near its inner periphery, said fulcrum means being secured to said second input member.

3. A clutch mechanism according to claim 1 and in which said spring has substantially circular inner and outer peripheries.

4. A clutch mechanism according to claim 1 and in which said release levers are circumferentially spaced apart and extend radially inwardly, one end of said levers being connected to said one portion of said spring, said levers having a midportion supported on said second input member near said other portion of said spring.

5. A clutch structure of claim 1 and in which said levers each have a hook shape end engaging the outer periphery of said spring, said lever extending radially inwardly from the point of its engagement with said spring.

6. A clutch mechanism having first and second relatively movable input members and an output member interposed between said input members, said members being arranged to rotate about a common axis, a flat annular spring having one portion exerting a force against said first input member and another portion exerting a force against said second input member whereby said input members are forced toward each other to clamp said output member therebetween, a plurality of rigid release levers connected to said spring and constructed to bend said spring in a direction away from its engagement with said first input members when said levers are angularly displaced thereby relieving the spring force on said first input member, said release levers being circumferentially spaced apart, the outer end of said levers being connected to the outer periphery of said spring and extending radially inwardly therefrom, said levers having a mid-portion supported on said second input member near said other portion of said spring.

7. A clutch structure of claim 6 and in which said levers each have a hook-shape end engaging the outer periphery of said spring.

8. A clutch mechanism having first and second relatively movable input members and an output member interposed between said input members, said members being arranged to rotate about a common axis, a flat annular spring having one portion exerting a force against said first input member and another portion exerting a force against said second input member whereby said input members are forced toward each other to clamp said output member therebetween, a plurality of rigid release levers connected to said spring and constructed to bend said spring in a direction away from its engagement with said first input members when said levers are angularly displaced thereby relieving the spring force on said first input member, a fulcrum means engaging said spring near its inner periphery, said fulcrum means being secured to said second input member, said release levers being circumferentially spaced apart, the outer ends of said levers being connected to the outer periphery of said spring and extend radially inwardly therefrom, said levers having a mid-portion engaging said fulcrum means, axially movable clutch release means engageable with the inner ends of said levers.

References Cited

UNITED STATES PATENTS 2,277,221  3/1942  Gamble _____ 192—68
3,235,049  2/1966  Hufstader _____ 192—69

BENJAMIN W. WYCHE, III Primary Examiner.

MARK M. NEWMAN, Examiner.

L. J. PAYNE, Assistant Examiner.